United States Patent [19]

Schleuchardt

[11] Patent Number: 4,926,990

[45] Date of Patent: May 22, 1990

[54] CLUTCH FOR FRANKING MACHINE

[75] Inventor: Manfred Schleuchardt, Offenbach am Main, Fed. Rep. of Germany

[73] Assignee: Francotyop-Postalia GmbH, Berlin, Fed. Rep. of Germany

[21] Appl. No.: 319,898

[22] Filed: Mar. 3, 1989

Related U.S. Application Data

[63] Continuation of Ser. No. 77,027, Jul. 20, 1987, abandoned, which is a continuation of Ser. No. 837,563, Mar. 3, 1986, abandoned, which is a continuation of Ser. No. 516,785, Jul. 25, 1983, abandoned, which is a continuation-in-part of Ser. No. 176,046, Aug. 7, 1980, abandoned.

[30] Foreign Application Priority Data

Aug. 7, 1979 [DE] Fed. Rep. of Germany ....... 2932427

[51] Int. Cl.[5] ........ F16D 11/02

[52] U.S. Cl. ........ 192/28; 101/245; 192/33 R

[58] Field of Search ........ 192/33 R, 26, 28, 39, 192/40, 71; 101/235, 245

[56] References Cited

U.S. PATENT DOCUMENTS

| | | | |
|---|---|---|---|
| 942,244 | 12/1909 | Boda | 192/71 X |
| 1,968,347 | 7/1934 | Ochsenbein | 101/235 X |
| 2,376,304 | 5/1945 | Anderson | 192/33 R X |
| 2,659,467 | 11/1953 | Zenner | 192/28 |
| 2,762,477 | 9/1956 | Zenner | 192/28 |

FOREIGN PATENT DOCUMENTS

| | | | |
|---|---|---|---|
| 1146406 | 5/1983 | Canada . | |
| 1080330 | 4/1960 | Fed. Rep. of Germany | 192/26 |
| 2056610 | 3/1981 | United Kingdom . | |

*Primary Examiner*—Rodney H. Bonck

*Attorney, Agent, or Firm*—Herbert L. Lerner; Laurence A. Greenberg

[57] ABSTRACT

Non-slipping clutch disposed between the drive and transport mechanism and between the drive and control cylinder for triggering printing in franking machines, including a shaft, a locking wheel being mounted on the shaft and engaged by the drive, internal gearing having an odd number of teeth formed on the locking wheel, a bushing being disposed on the shaft and connectible to the transport mechanism and control cylinder, a locking gear disposed on the bushing opposite the locking wheel, teeth disposed on part of the periphery of the locking gear, two pawls being disposed in the locking gear and extended into the locking wheel for engaging the internal gearing, a lever rotatably disposed on the bushing adjacent the locking gear, fingers being integral with the lever and engageable with the pawls, a torsion spring for rotating the lever and fingers to push the pawls into the internal gearing and couple the locking wheel and locking gear, and an electro-magnetically controlled latch for preventing the lever from being rotated by the spring, the locking gear being siplessly rotated by the drive engaging the locking wheel after initial rotation of the locking wheel.

4 Claims, 1 Drawing Sheet

CLUTCH FOR FRANKING MACHINE

This application is a continuation of application Ser. No. 077,027, filed July 20, 1987, which is a continuation of application Ser. No. 837,563, filed Mar. 3, 1986, which is a continuation of application Ser. No. 516,785, filed July 25, 1983, which is a continuation-in-part of application Ser. No. 176,046, filed Aug. 7, 1980, all now abandoned.

The invention relates to a slipless or non-slipping clutch disposed on the one hand between the drive and the transport mechanism, and on the other hand between the drive and a control cylinder controlling and triggering the printing in franking machines.

In franking machines, the transport mechanism serves for feeding, as well as for pressing the piece of mail to be stamped against the printing cylinder. This transport mechanism must be coupled to the control cylinder of the franking machine in such a manner that the exact presentation and transportation of the piece of mail during the franking process is ensured. A slipless connection which would do this has not been available heretofore.

It is accordingly an object of the invention to provide a clutch for franking machines which overcomes the hereinafore-mentioned disadvantages of the heretofore-known devices of this general type, and to ensure a slipless connection between the drive of a franking machine on the one hand, and the transport mechanism and the control cylinder on the other hand.

With the foregoing and other objects in view there is provided, in accordance with the invention, a non-slipping clutch disposed between the drive and transport mechanism and between the drive and control cylinder for triggering printing in franking machines, comprising a shaft, a locking wheel being mounted on the shaft and engaged by the drive, internal gearing having an odd number of teeth formed on the locking wheel, a bushing being disposed on the shaft and connectible to the transport mechanism and control cylinder, a locking gear disposed on the bushing opposite the locking wheel, teeth disposed on part of the periphery of the locking gear, two pawls being disposed in the locking gear and extended into the locking wheel for engaging the internal gearing, a lever rotatably disposed on the bushing adjacent the locking gear, fingers being integral with the lever and engageable with the pawls, a torsion spring for rotating the lever and fingers to push the pawls into the internal gearing and couple the locking wheel and locking gear, and an electro-magnetically controlled latch for preventing the lever from being rotated by the spring, the locking gear being sliplessly rotated by the drive engaging the locking wheel after initial rotation of the locking wheel through a small angle.

In accordance with another feature of the invention, only one of the pawls at a time engages the odd numbered teeth of the internal gearing, whereby engagement time is cut in half.

In accordance with a further feature of the invention, there are provided compression springs biasing the pawls away from the internal gearing.

In accordance with an added feature of the invention, there are provided teeth formed on the periphery of the locking gear and locking wheel having the same pitch circle diameter, tooth pitch and tooth thickness.

In accordance with a concomitant feature of the invention, the bushing is pushed on the shaft.

Other features which are considered as characteristic for the invention are set forth in the appended claims.

Although the invention is illustrated and described herein as embodied in a clutch for franking machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
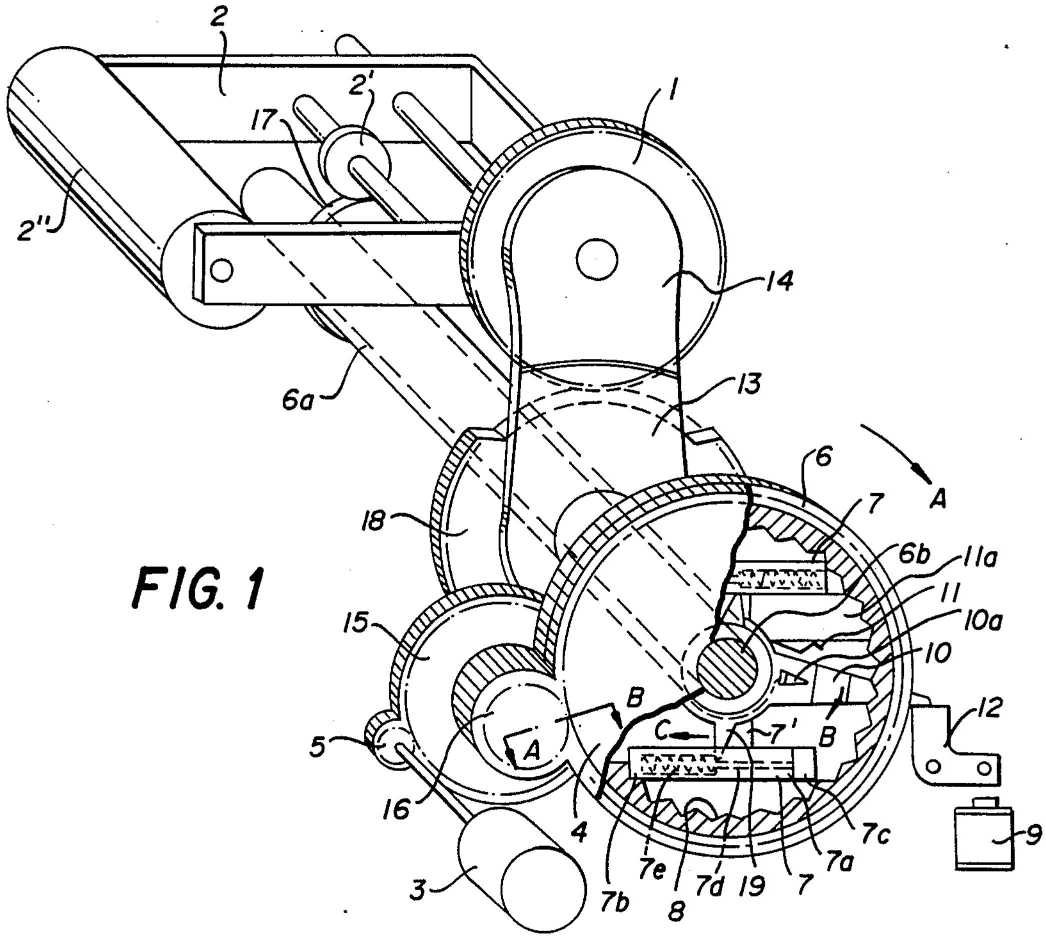
FIG. 1 is a diagrammatic perspective view, partly broken away, of the drive mechanism with the clutch device of the invention.
Figure 2:
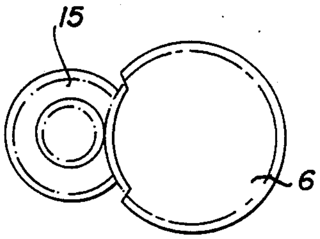
FIG. 2 is a diagrammatic elevational view of the gearing between a drive pinion and the locking gear.
Figure 3:
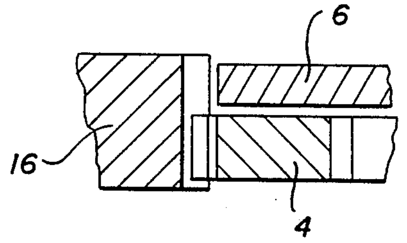
FIG. 3 is a fragmentary cross-sectional view taken along the line A-B in FIG. 1, in the direction of the arrows.

Referring now particularly to FIGS. 1, 2 and 3 of the drawing as a whole, it is seen that a detent or locking wheel 4 is in continuous engagement with the drive or motor 3 through gearing indicated by reference numerals 5, 15 and 16. The detent wheel 4 is partially broken away so that it can be seen that it is mounted on a shaft *6b*. A shaft bushing *6a* is pushed over the shaft *6b*. Placed one behind the other on the shaft bushing *6a* there are a locking gear 6 to be slipplessly rotated in accordance with the invention, a lever 10, a locking disc 13 having a convex upper surface, a control disc gear 18 and a control disc 17 in a positive and/or form locking manner. The lever 10 is offset or Z-shaped, so that it can contact a latch 12 but it protrudes into the detent wheel 4. The term form-locking refers to a mutual locking together of two elements, effected by a shape of the elements themselves.

The detent wheel 4 is provided with internal gearing 8 having an uneven number of teeth. The locking wheel 6 includes two detents or pawls 7 each being disposed in a respective slot *7c* in the locking gear 6 and each having two ends *7a* and *7b*. A clip *7d* at the end *7a* is pushed away from the clip *7d* in the end *7b* by a compression spring. However, fingers 19 are inserted in slots in the pawls or detents 7 and when the fingers 19 move in the direction of the arrow C, they push the compression springs and the ends *7b* into the teeth of the gearing 8. The detents 7 are swingable with the shaft bushing *6a* over a small angle. The detents 7 are supported on bars 7' on the bushing *6a*. The compression springs prevent blocking or disturbances when engaging the clutch, such as if a corner of the detent 7 hits the tip of a tooth of the internal gearing. Thus, a kind of free-wheeling or coasting clutch is obtained, which can be turned back by hand if there are disturbances in the machine. The drawing shows a point in time when the clutch is about to be switched into the uncoupled position and out of the coupled position in which the detent wheel 4 moves in the direction of the arrow A, caused by rotation of the drive 3. The end *7b* does not lie deeply in the teeth 8 and only contacts the wheel 4 so that it does not couple the wheel 4 and gear 6 together by itself. The coupling process is triggered by energizing an electromagnet 9, which rotates a latch 12 clockwise causing it to release the lever 10. The lever 10 is swung under the action of a torsion spring 11 clockwise in the direction of the arrow B, so that its fingers 19 move the detents 7 of the locking gear 6 in the direction of the arrow C. This causes one end *7b* to fall into the internal gear tooth directly below and locks the wheels 4, 6. The spring 11 is hooked into a hole 10*a* and is biased against an edge of a bar 11*a*.

Through the choice of an uneven number of teeth for the internal gearing 8, the clutch engagement time is cut in half because only one detent end *7b* drops in. The opposite detent end always remains half offset in the undetented condition.

The locking gear 6 which has the same tooth pitch, tooth thickness and pitch circle diameter as the detent wheel 4, is moved exclusively by the detent wheel 4 up to the engagement of the gear 16 after a small angle of rotation into the gearing of the locking gear 6. Through the motion of the locking gear 6, the convex locking disc 13 is also taken along and releases the control cylinder 1 by disengaging the locking disc 14 which has a concave lower surface.

The concave lower surface of the locking disc 14 is locked in engagement with the convex upper surface of the locking disc 13 in the position shown in FIG. 1. However, when the gear 6 is rotated the bushing *6a* is rotated which turns the locking disc 13 and forces it out of engagement with the locking disc 14. The gear 18 is also turned when the gear 6 and bushing *6a* rotate so that the control disc gear 18 meshes with the gearing of the control cylinder 1.

As mentioned above, the control disc 17 is fastened to the bushing *6a* so that they always rotate together. However, as seen in FIG. 1, the control disc 17 is eccentric to the bushing *6a*. Therefore, a wheel 2' is frictionally engaged by the control disc 17 over only a part of a revolution of the control disc 17 and slips free for the rest of the revolution. This causes the roller 2" to rock up and down as the bushing *6a* rotates. The control cylinder 1 is therefore coupled with the control disc 17 through the gear 18 and bushing *6a* for moving a transport mechanism 2 through the rotation of the shaft bushing *6a*. Therefore, the control cylinder 1 and the transport mechanism 2 are both rotated by the bushing *6a*. The transport mechanism 2 feeds letters and the control cylinder 1 controls postage printing in another mechanism.

During one revolution, the electromagnet 9 is disconnected and the latch 12 assumes its starting position. The lever 10 runs up onto the latch 12 after one at the moment of time shown in FIG. 1 and therefore permits the detent end *7b* to fall out of the internal gearing 8 of the detent wheel 4 and therefore decouples the detent wheel 4 and the locking gear 6 after the moment shown in FIG. 1. The drive then sliplessly rotates the locking gear 6 after the detent or locking wheel has rotated through a small angle of rotation.

Since the locking gear 6 does not have teeth on part of its circumference, as especially seen from FIG. 3, the drive by the gear 16 is eliminated at that part. The starting position is reached again after one revolution and remains intact regardless of whether or not the drive 3 continues to run.

There are claimed:

1. In a franking machine having a drive, a transport mechanism, and a control cylinder, a non-slipping overrunning latch-type clutch disposed between the drive and transport mechanism and between the drive and control cylinder for triggering printing in franking machines, comprising a shaft, a locking wheel being mounted on said shaft and engaged by the drive, internal gearing having an odd number of teeth formed on said locking wheel, a bushing being disposed on said shaft and connectible to the transport mechanism and control cylinder, a locking gear disposed on said bushing adjacent said locking wheel, teeth disposed on part of the periphery of said locking gear, at least one pawl being disposed in said locking gear and extended into a hollow space formed in said locking wheel for engaging said internal gearing, a lever disposed on said bushing adjacent said locking gear, at least one finger being integral with said lever and engageable with said at least one pawl, a torsion spring for rotating said lever and at least one finger to push said at least one pawl into said internal gearing and couple said locking wheel and locking gear, and an electromagnetically controlled latch for preventing said lever from being rotated by said spring in a first position and for allowing said at least one finger to push said at least one pawl into said internal gearing in a second position, said locking gear being sliplessly rotated by the drive engaging said locking wheel after initial rotation of said locking wheel.

2. Non-slipping clutch according to claim 1, wherein said at least one pawl comprises two pawls and only one of said pawls at a time engages said odd numbered teeth of said internal gearing, whereby engagement time is cut in half.

3. Non-slipping clutch according to claim 1, including a compression spring biasing said at least one pawl away from said internal gearing.

4. Non-slipping clutch according to claim 1, including teeth formed on the periphery of said locking gear and locking wheel having the same pitch circle diameter, tooth-pitch and tooth thickness.

* * * * *